United States Patent [19]

Miller et al.

[11] 4,175,396
[45] Nov. 27, 1979

[54] CRYOGENIC EMBRITTLEMENT FREEZER WITH GAS LOCK

[75] Inventors: Keith A. Miller, Allentown; Eric C. Osmundson, Bethlehem, both of Pa.

[73] Assignee: Air Products and Chemicals, Inc., Allentown, Pa.

[21] Appl. No.: 907,428

[22] Filed: May 19, 1978

[51] Int. Cl.² ............................................. F25D 13/06
[52] U.S. Cl. ........................................ 62/63; 62/266;
62/374; 62/380; 34/242
[58] Field of Search ................... 62/63, 265, 266, 374,
62/375, 380; 34/242

[56] References Cited
U.S. PATENT DOCUMENTS

| 2,951,353 | 9/1960 | Morrison | 62/375 |
| 3,022,636 | 2/1962 | Morrison | 62/64 |
| 3,048,989 | 8/1962 | Morrison | 62/375 |
| 3,090,134 | 5/1963 | Morrison | 62/375 |
| 3,282,067 | 11/1966 | Dreksler | 62/266 |
| 3,299,659 | 11/1967 | Dreksler et al. | 62/266 |
| 3,531,946 | 10/1970 | Hart | 62/332 |
| 3,914,953 | 10/1975 | Miller | 62/266 |

*Primary Examiner*—Ronald C. Capossela
*Attorney, Agent, or Firm*—Ronald B. Sherer; E. Eugene Innis

[57] ABSTRACT

A cryogenic freezer is disclosed for embrittling scrap material, such as random size pieces of automobile tires, prior to fragmentation of the embrittled scrap material in an impact mill. The freezer includes a product discharge gas lock which is designed to minimize the loss of cryogenic refrigerant while, at the same time, accomodating unusually large pieces of scrap material.

9 Claims, 7 Drawing Figures

CRYOGENIC EMBRITTLEMENT FREEZER WITH GAS LOCK

BACKGROUND OF THE INVENTION

Many prior attempts have been made to design embrittlement freezers using cryogenic liquids in order to cool metallic, rubber and plastic materials below their embrittlement temperature. The embrittled material is fragmented in various types of impact mills in order to recover and recycle valuable components of the embrittled waste materials. One such cryogenic freezer is disclosed in U.S. Pat. No. 3,914,953 which is particularly designed for embrittling large metallic objects such as motors, transformers and scrap automobile bodies. At the same time, numerous cryogenic freezers have been designed for freezing food products such as the freezer designs disclosed in U.S. Pat. Nos. 3,531,946 and 3,022,636. In such cryogenic freezers, there has been a persistent problem in effectively sealing the ends of tunnel-type freezers, and particularly the discharge end, against the loss of cold refrigerant gas and the entrance of warm, moist ambient air. A large number of solutions have been proposed to solve this problem including air and gas curtains such as disclosed in U.S. Pat. Nos. 3,531,946 and 3,914,953. In addition, various types of gas locks have been attempted including star-wheels, and those formed between flexible curtains, rotating brushes, and sliding or pivoted doors as taught, for example, in U.S. Pat. Nos. 2,951,353; 3,048,989; 3,090,134; and 3,022,636. While the prior designs of gas locks may be partially effective in food freezers where the products are small and uniform in shape such that the entrance and discharge openings are quite small and not subject to jamming, the use of gas locks has not been efficient, particularly in the large type of cryogenic freezers which are required for embrittling large articles of non-uniform size or shape as described above. In addition, a freezer designed particularly for use in embrittling large pieces or strips of automobile and truck tires presents additional problems due to the totally irregular shapes of the pieces being cooled which not only require a large gas space within the gas lock, but also tend to jam the locks whenever an unusually large piece is encountered.

The present invention solves this long-standing problem of effectively sealing both ends of a large, embrittlement freezer which is particularly designed for embrittling random size pieces of scrap tires.

SUMMARY OF THE INVENTION

The present freezer employs a negative gas curtain at the inlet end of the tunnel, and a gas lock formed between a pair of arcuate shaped closure members at the discharge end of the freezer. The arcuate shape of the closure members is such that there is sufficient clearance between the members to accommodate unusually large pieces while, at the same time, providing a minimized gas space within the lock so that the loss of cold refrigerant gas is substantially reduced. Except for the small amount of refrigerant gas contained between the arcuate closure members forming the gas lock, all of the remaining refrigerant gas is positively sealed at the discharge end such that the refrigerant gas is forced to flow in a countercurrent heat exchange relationship with the incoming product, and is exhausted at the product inlet end of the freezer as a negative gas curtain which precludes the entrance of warm ambient air. The invention also includes position sensors for sensing the correct relative positions of the closure members, and initiates clearing of both closure members when a jam of either member is detected.

DETAILED DESCRIPTION

Figure 1:
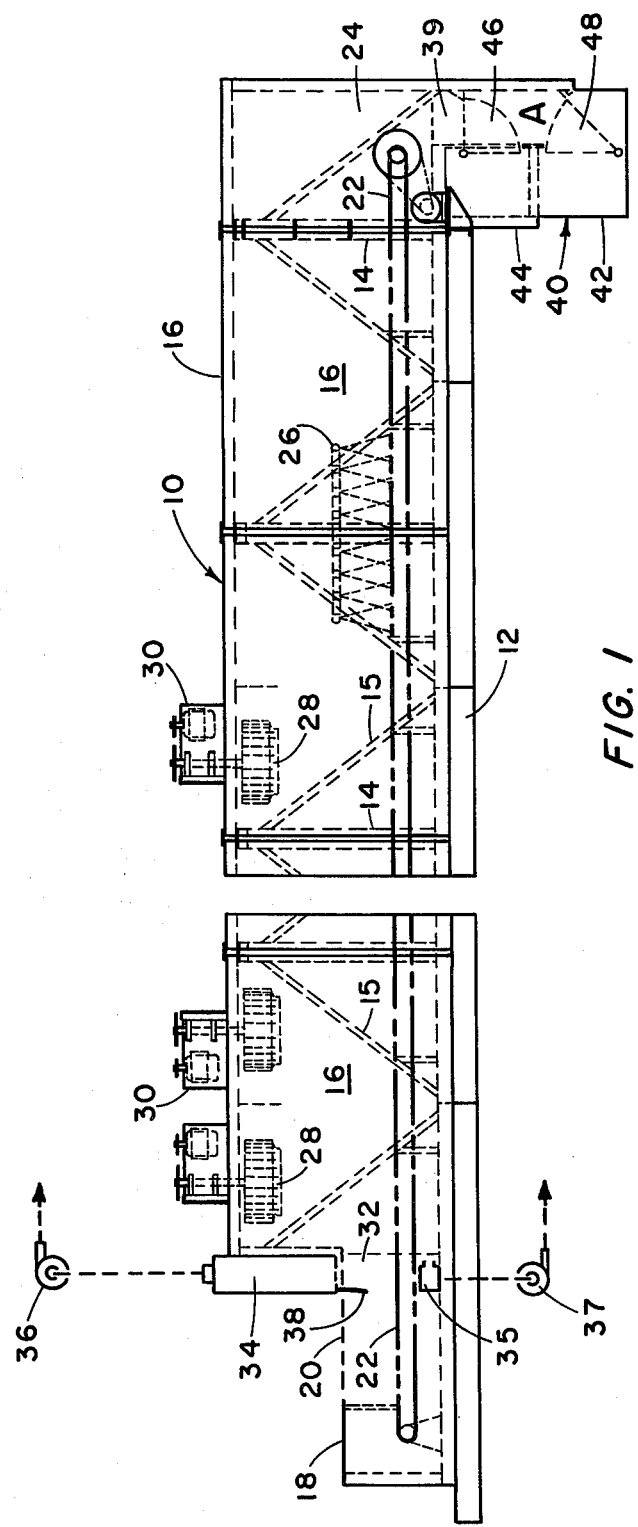
FIG. 1 is a simplified, side-elevational view of the freezer showing the inlet and discharge ends of the freezer.
Figure 2:
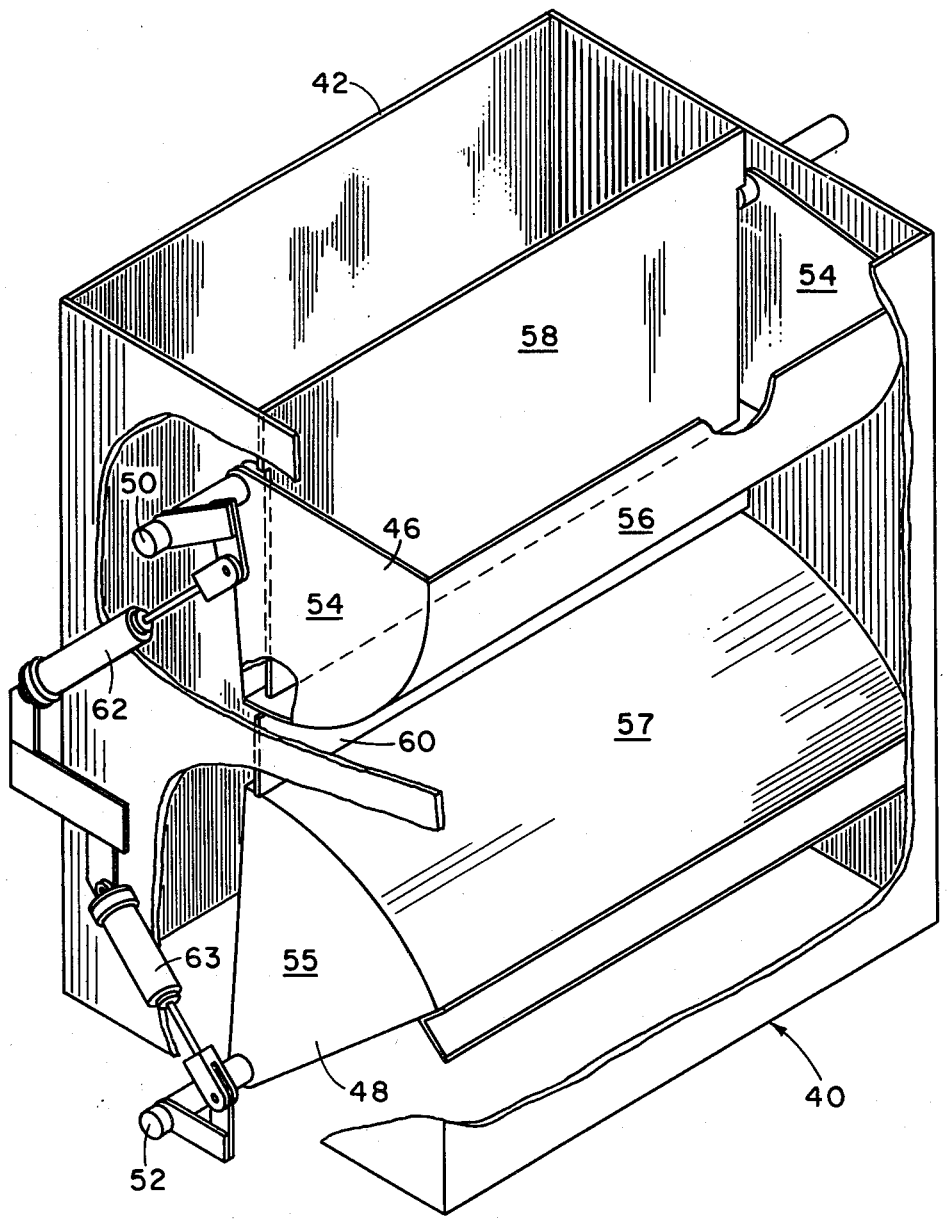
FIG. 2 is a simplified, isometric view of the arcuate hoppers forming the closure members of the gas lock.

Referring first to FIG. 1, the overall freezer 10 includes horizontally extending support members 12, which may be I-beams, and a plurality of vertically extending frame members 14. Frame members 14 may be braced by diagonally extending braces 15, and a plurality of side and top insulation panels 16 are suitably secured to frame members 14 so as to form an elongated, horizontally extending, insulated tunnel. At the left-hand side of FIG. 1, freezer 10 includes a feed section 18 having an opening 20 through which the articles to be embrittled are dropped onto a conveyor 22 which extends throughout the length of the freezer and discharges the embrittled material at discharge end 24.

A spray header 26 is provided near the discharge end of the freezer for spraying a cryogenic refrigerant, such as liquid nitrogen, into direct contact with the articles to be embrittled. Because of the effectiveness of the gas lock, as will be subsequently described, the cold refrigerant gas which vaporizes in the spray zone is forced to flow toward the inlet end of the freezer in countercurrent heat exchange relationship with the articles being conveyed toward the discharge end of the freezer by conveyor 22. As is well known in the prior art, the cold refrigerant gas is circulated in a plurality of high velocity recirculation zones by fans or blowers 28 which are driven by suitable motor and drive assemblies 30. Of course, it will be understood that the freezer is of substantial length, and that there may be a large number of such gaseous recirculation zones provided between the inlet and outlet ends which are shown in fragmentary form in FIG. 1.

Referring to the feed end 18 of the freezer, the scrap material on belt 22 passes into the freezer through inlet opening 32. This opening is effectively sealed by a pair of upper and lower plenum chambers 34 and 35 which are connected to suction blowers 36 and 37, respectively. Of course, it will be apparent that a single suction blower may be connected to both plenum chambers 34 and 35 by a suitable common duct. Preferably, a curtain or flap 38 is also provided to accommodate variations in the depth of the scrap material which may be less than the height of opening 32. Thus, operation of suction blowers 36 and 37 creates a negative gas curtain in the area of product inlet 32 in that a mixture of ambient air and warm exiting refrigerant gas is drawn into the plenum chambers which precludes the entrance of ambient air into the freezer through product inlet opening 32. While plenum chambers 34 and 35 produce a low pressure area immediately adjacent product inlet opening 32, it will be understood that this is a highly localized low pressure area which does not significantly effect the gas flow within the freezer. That is, the bulk of the refrigerant gas is forced to flow through the freezer from the spray zone, in which it is generated, toward the product inlet end of the freezer by virtue of the fact that the pressure of the rapidly vaporizing refrigerant in the spray zone is slightly above atmospheric pressure, and the discharge outlet is effectively sealed by the gas lock as will become more fully apparent.

Referring to the discharge end 24 of the freezer as shown in FIG. 1, a discharge opening 39 is provided in the bottom of the freezer so that the embrittled articles are discharged from conveyor belt 22 into the discharge gas lock generically represented by numeral 40. Discharge gas lock 40 comprises a vertical discharge duct 42 which may be formed of sheet metal or other suitable material. The upper portion of discharge duct 42 is preferably insulated by thermal insulation 44, and contains a pair of upper and lower closure members 46 and 48 which define a gas lock zone A therebetween.

As more clearly shown in FIGS. 2–6, upper closure member 46 is in the form of a hopper which is suitably journaled in bearings (not shown) for pivotal movement about the axis of shaft 50, while lower closure member or hopper 48 is similarly journaled in bearings (not shown) for pivotal movement about shaft 52. Hoppers 46 and 48 each include pie-shaped side plates 54,55 the arcuate edges of which are connected by curved segments 56,57 such that the hoppers comprise approximately quarter segments of cylinders. Thus, as most clearly shown in FIGS. 1 and 3, zone A between curved segments 56.57 is substantially bell-shaped in the vertical plane.

As further shown in FIGS. 2–6, the upper portion of discharge duct 42 is divided approximately in half by first and second vertically extending partitions 58 and 60. Upper partition 58 is located within upper hopper 46 so that the lower edge of partition 58 sweeps across the upper, interior surface of curved segment 56 as upper hopper 46 pivots from the closed position shown in FIG. 3 to the open position shown in FIG. 4. Similarly, the lower edge of lower partition 60 sweeps across the upper surface of curved segment 57 as lower hopper pivots from its closed position shown in FIG. 4 to its open position shown in FIG. 6.

In the preferred embodiment of the invention, hoppers 46,48 are pivoted from their closed to open positions by a pair of power actuators in the form of pneumatic or hydraulic cyclinders 62,63 while the return movements to their closed positions may be accomplished by tension springs (not shown) or by the reverse action of the actuators. The actuators are sequenced by a normal cycle controller as will be subsequently described with reference to FIG. 7.

Figure 3:
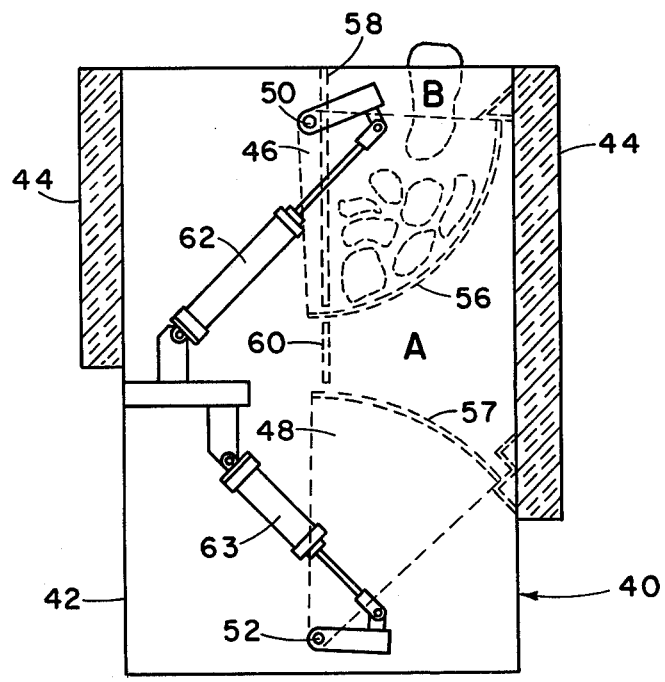
FIGS. 3–6 are side-elevational views of the arcuate hoppers in their various relative positions during the discharge sequence.

In operation, a feed shute (not shown) continuously supplies the articles to be embrittled to the inlet end of the freezer 10 such that they fall through opening 20 onto conveyor belt 22 and are conveyed through the high velocity, gaseous precooling zones in which they are progressively cooled in countercurrent heat exchange with the vaporized refrigerant gas. The particles then reach the spray zone, in which spray header 26 is located, and are deeply cooled so as to reach an equilibration temperature below their embrittlement temperature during the residence time between spray header 26 and discharge end 24. Conveyor belt 22 continuously discharges the embrittled pieces such that they fall downwardly through discharge opening 39 into the upper portion of discharge duct 42. As shown in FIG. 3, the embrittled pieces are collected in hopper 46 where they rest upon the upper, concave surface of curved segment 56. In addition to the pieces of anticipated size for which the freezer and discharge gas locks have been designed, FIG. 3 shows an unusually large piece of embrittled material B which may be as large as two feet in length. This unusually large piece also falls into the upper hopper 46 where its unusually large size prevents no difficulty since the cord of arcuate segment 46 is greater than two feet.

Figure 4:
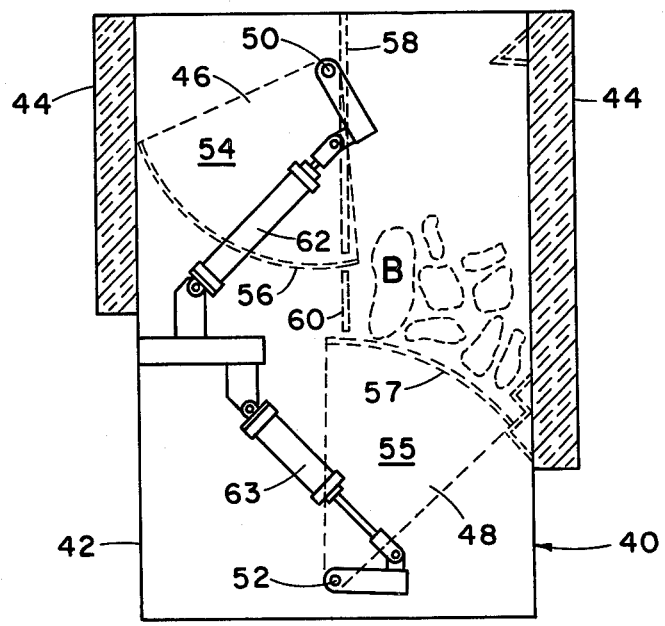
Figure 5:
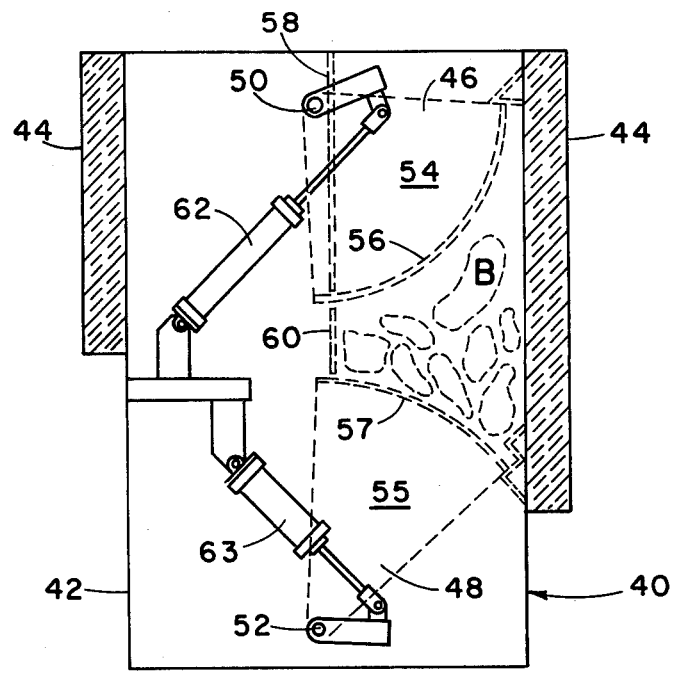

In the next sequence of operation, as shown in FIG. 4, upper hopper 46 has been pivoted about shaft 50 by cylinder 62 such that arcuate segment 56 passes through the slot between partitions 58 and 60. As previously described, upper partition 58 acts as a wiper blade such that the embrittled pieces are dumped into the bell-shaped zone A between the upper and lower hoppers where the pieces are supported by the upper, convex surface of arcuate segment 57. At this point, it will be apparent that the unusually large piece B would normally present a problem of jamming if the sliding or pivoted flat doors of the prior art were employed. However, as shown in FIG. 5, the return of upper hopper 46 to its closed position forces the extra large piece B to lie in a horizontal, or substantially horizontal, position so that its unusual length is readily accommodated by the lateral width of gas lock zone A between the upper and lower hoppers. Alternatively, such an extra large piece may even remain in a vertical position since the arcuate shape of the hoppers provides a sufficiently large vertical space in the right-hand portion of the bell-shaped zone A between the upwardly curved segment 56 and the downwardly curved segment 57. Accordingly, even exceptionally large pieces may be readily accommodated without jamming of the arcuate shaped hoppers forming the gas lock of the present invention.

Figure 6:
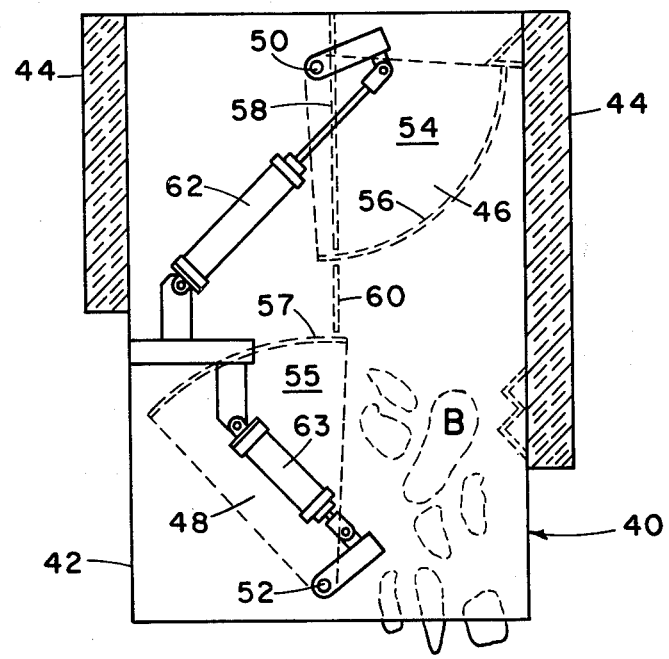

After upper hopper 46 has returned to its closed position as shown in FIG. 5, the lower hopper 48 is then pivoted, as shown in FIG. 6, such that its arcuate segment 57 passes beneath the wiper edge of partition 60, and the embrittled pieces are freely discharged through the open and unobstructed discharge duct 42. The lower hopper 48 then returns to its closed position such that both hoppers are in their closed positions as shown in FIG. 3, and the discharge cycle of the gas lock is ready to be repeated.

In addition to accommodating embrittled pieces of extra large size, it will be noted that the bell-shaped gas space between the closed hoppers comprises a minimum volume such that only a very small amount of cold refrigerant gas is permitted to escape during each discharge cycle. Actually, the discharge of this small amount of refrigerant gas is beneficial since the discharged gas is replaced by colder, newly generated gas from the spray zone so that cold gas is always maintained in the equilibration zone located between the spray zone and product discharge opening 39.

Figure 7:
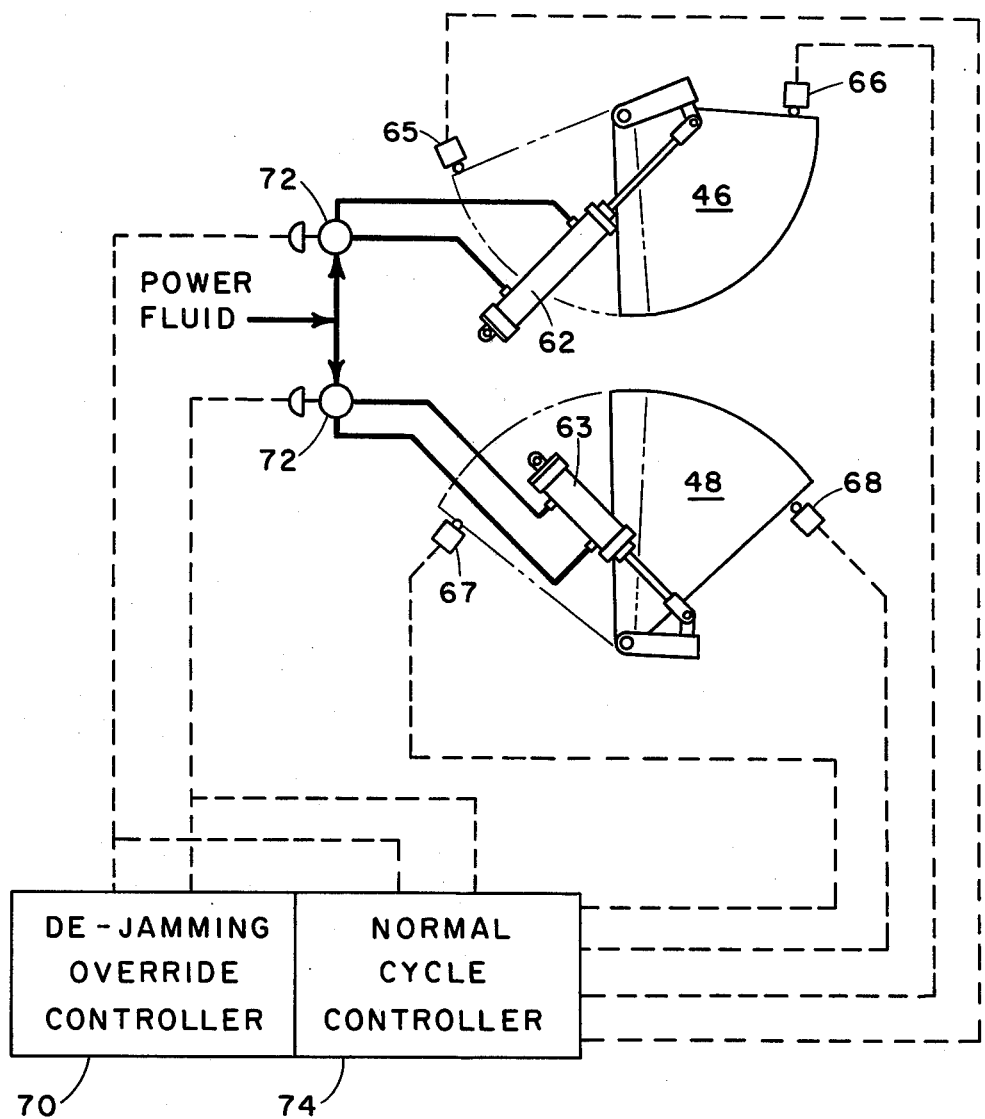
FIG. 7 is a schematic diagram of the gas lock control system.

In addition to the particular design of the gas lock 40 to accomodate extra large pieces of scrap as just described, the present invention provides a method for clearing the gas lock in the event of any jamming which, for example, might result from a thin section of one of the pieces becoming wedged between a hopper and the associated wiper edge. Referring to FIG. 7, four position sensors 65, 66, 67 and 68 are mounted in suitable locations such that sensors 65 and 66 detect the open and closed positions of upper hopper 46, while sensors 67 and 68 detect the open and closed positions of lower hopper 48. The position sensors may be physically located in any suitable position and may be of any commercially available type such as limit switches, micro-switches, or proximity relays which sense the presence of metallic objects such as the hoppers or associated linkage. The position sensors are connected through a de-jamming override controller 70, which may be of the time-function type, to the actuator valves 72 which control the movements of power cylinders 62 and 63.

In operation, the hoppers open and close in the normal sequence previously described under the control of normal controller 74 so long as neither hopper becomes jammed. However, when either of the hoppers becomes jammed such that it is not in its proper open or closed position relative to the sensed position of the other hopper, the de-jamming controller 70 overrides the normal cycle of the actuator valves such that power fluid is admitted to both cylinders 62 and 63 to attempt to simultaneously move both hoppers to their open positions. This empties both hoppers, or at least the non-jammed hopper, and the actuator valves are then reversed so that both cylinders attempt to close their respective hoppers. At this point, if both hoppers are not in their closed positions, as detected by sensors 66 and 68, the override controller 70 again attempts to open and close both hoppers to free the jammed piece from the hopper. This overriding de-jamming cycle continues for a predetermined period, or a predetermined number of cycles after which, if both hoppers are still not in their closed positions as shown in FIG. 3, an alarm is sounded and/or the freezer is automatically shut down until the jam is manually cleared.

From the foregoing description it will be apparent that the present invention provides a highly efficient embrittlement freezer in which both ends of the freezer are effectively sealed while also accomodating both unusually large or small pieces of scrap material. It will also be understood that the foregoing description of one preferred embodiment of the invention is intended to be merely illustrative, and that the true invention is not to be limited other than as set forth in the following claims.

What is claimed is:

1. A method of operating a cryogenic, tunnel-type freezer having a product inlet and a product outlet comprising:
   (a) conveying product to be embrittled from said inlet to said outlet,
   (b) contacting product with a cryogenic liquid refrigerant in a contact zone to generate cold refrigerant gas within said tunnel,
   (c) generating said gas at a rate sufficient to create a slightly superatmospheric pressure in said contact zone,
   (d) mechanically sealing said product outlet with a gas lock to force said refrigerant gas to flow from said contact zone to said product inlet, wherein said step of mechanically sealing comprises alternately pivoting a pair of closure members between open and closed positions during normal operation of said freezer, and simultaneously pivoting both of said closure members to their open and closed positions for de-jamming said gas lock,
   (e) circulating said refrigerant gas in contact with said product between said contact zone and said product inlet,
   (f) creating a localized low pressure zone adjacent said product inlet, and
   (g) withdrawing refrigerant gas through only said product inlet as a negative gas curtain.

2. A cryogenic embrittlement freezer comprising:
   (a) an insulated tunnel having a product inlet and a product outlet,
   (b) means for conveying product to be embrittled from said inlet to said outlet,
   (c) a liquid contact zone including means for contacting said product with a cryogenic liquid refrigerant whereby said liquid vaporizes to form a cold refrigerant gas,
   (d) at least one gaseous refrigerant zone for cooling said product with said cold refrigerant gas between said inlet and said liquid contact zone, and
   (e) a discharge gas lock positioned to receive embrittled articles through said product outlet, said gas lock including a pair of pivoted closure members having arcuate product retaining surfaces and defining a substantially bell-shaped gas zone therebetween.

3. The freezer as claimed in claim 2 in which said discharge gas lock includes a vertically extending duct in which said first closure member is positioned vertically above said second closure member.

4. The freezer as claimed in claim 2 further including at least one plenum chamber adjacent said product inlet, and suction blower means for creating a low pressure negative gas curtain at said product inlet.

5. The freezer as claimed in claim 4 including a second plenum chamber adjacent said product inlet, and in which said first and second plenum chambers are positioned vertically above and below said conveyor means.

6. The freezer as claimed in claim 2 in which said closure members comprise first and second hoppers, each of said hoppers having a pair of end plates with arcuate edges, and said arcuate product retaining surfaces are formed by curved segments extending between said end plate arcuate edges.

7. The freezer as claimed in claim 2 in which the arcuate product retaining surface of said first closure member is concave, and the arcuate product retaining surface of said second closure member is convex.

8. The freezer as claimed in claim 2 including actuator means for pivoting each of said closure members between open and closed positions, and normal cycle controller means for opening said second hopper only after said first hopper has opened and returned to its closed position.

9. The freezer as claimed in claim 8 further including second, overriding controller means for simultaneously opening both said first and second closure members at the same time for de-jamming said gas lock.

* * * * *